F. KAWELL.
TRANSMISSION GEARING.
APPLICATION FILED FEB. 1, 1918.
1,291,542.
Patented Jan. 14, 1919.
2 SHEETS—SHEET 1.
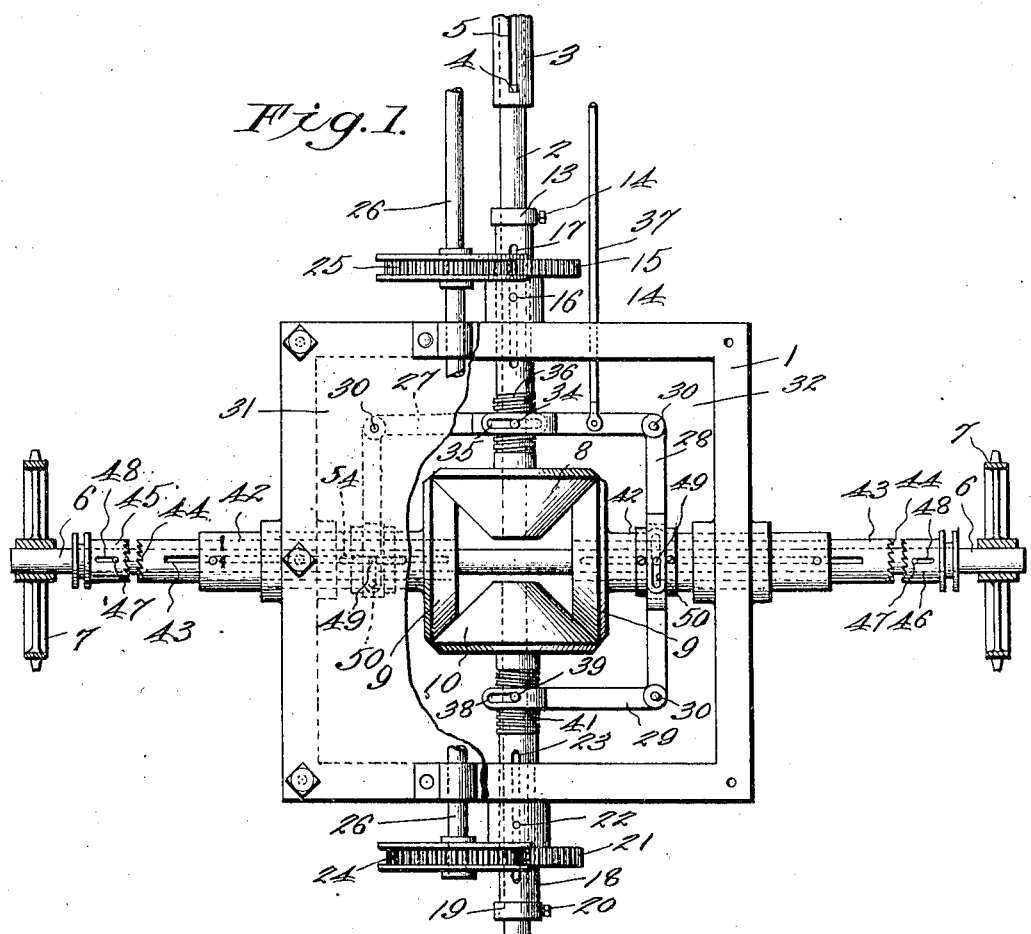
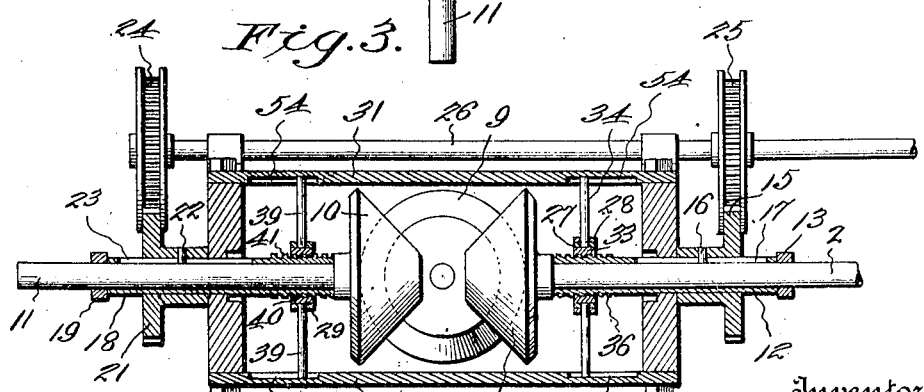
Inventor
Fred Kawell,
Witness
By Victor J. Evans
Attorney F. KAWELL.
TRANSMISSION GEARING.
APPLICATION FILED FEB. 1, 1918.
1,291,542.
Patented Jan. 14, 1919.
2 SHEETS—SHEET 2.
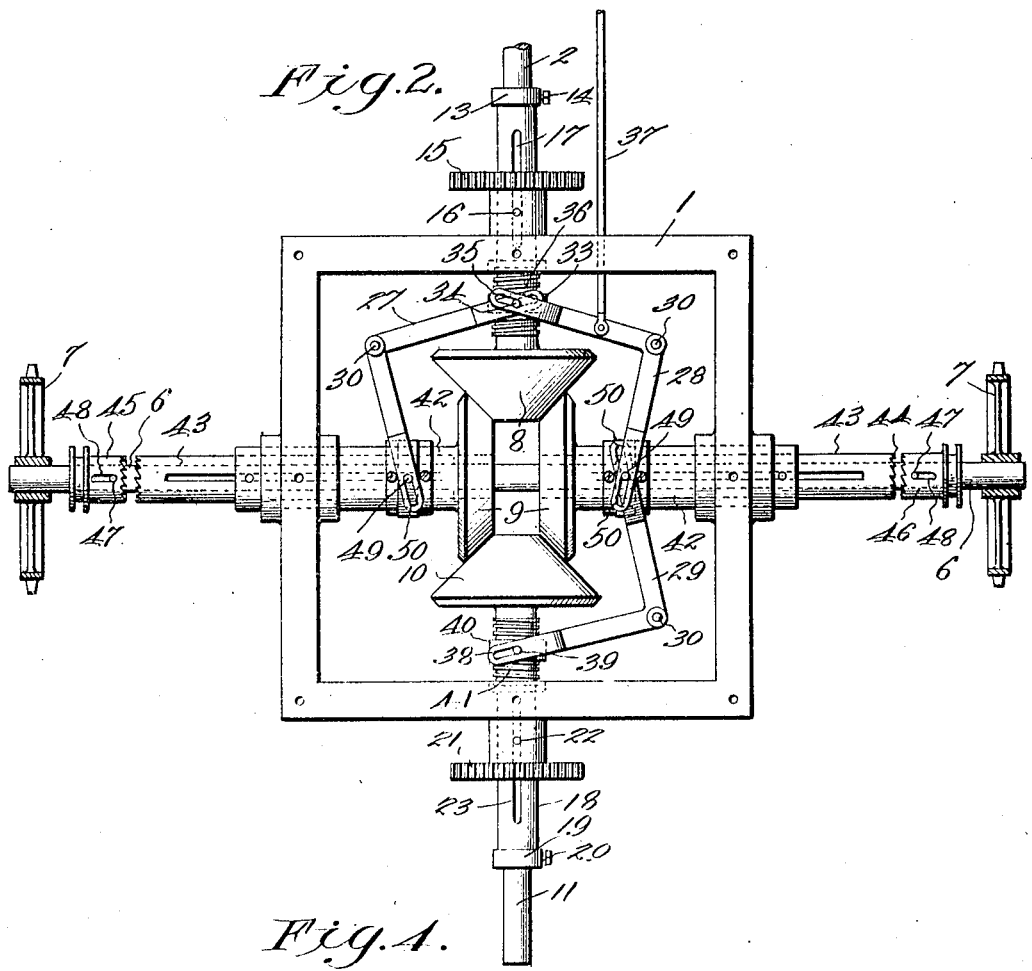
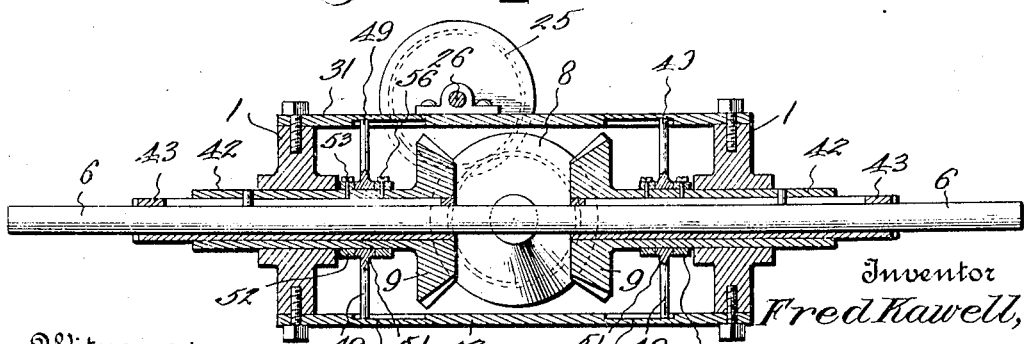
Witnesses
Inventor
Fred Kawell,
By Victor J. Evans
Attorney

UNITED STATES PATENT OFFICE.

FRED KAWELL, OF MANKATO, MINNESOTA.

TRANSMISSION-GEARING.

1,291,542.  Specification of Letters Patent.  Patented Jan. 14, 1919.

Application filed February 1, 1918. Serial No. 214,964.

*To all whom it may concern:*

Be it known that I, FRED KAWELL, a citizen of the United States, residing at Mankato, in the county of Blue Earth and State of Minnesota, have invented new and useful Improvements in Transmission-Gearings, of which the following is a specification.

This invention relates to transmission gearings and in the preferred embodiment thereof gears of the bevel friction type are employed.

The object of the invention is to provide in connection with a driving shaft and a driven shaft disposed in perpendicular relation to each other, beveled gears mounted upon said shafts and having frusto-conical coacting faces, together with novel means for shifting said gears in relation to each other to vary the ratio of speed between the driving shaft and driven shaft. The gearing hereinafter particularly described is designed especially for use in transmitting motion from the engine of a motor vehicle to the driving wheels thereof but it will be apparent as the description proceeds that the said transmission mechanism may be used in other connections and for various purposes which will suggest themselves to the manufacturer.

With the above and other objects in view, the invention consists in the novel construction, combination and arrangement of parts, herein described, illustrated and claimed.

In the accompanying drawings:—

Figure 1 is a plan view of the transmission gearing showing the gears thereof arranged for high speed.

Fig. 2 is a similar view showing the gears positioned for low speed.

Fig. 3 is a section in line with the driving shaft.

Fig. 4 is a section in line with the driven shaft.

In carrying out the present invention, I employ a frame 1 which may be of any suitable construction, the same being shown as of square or rectangular formation as it adapts itself to the arrangement and operation of the gear shifting means hereinafter particularly described.

2 represents the power or driving shaft which embodies a telescopic section 3, one of said sections being provided with a pin 4 or the equivalent thereof which is movable lengthwise of a longitudinal slot 5 in the other member, this being done in order to admit of the sliding movement of one section of the driving shaft in relation to the other section thereof. The driven shaft is indicated at 6 and is perpendicular to the shaft 2 and may be continuous from end to end as shown in the drawings, the shaft 6 having fast thereon gears 7 shown in the form of sprocket wheels from which driving chains may extend to a countershaft or to the driven wheels of the vehicle, in accordance with the make of the vehicle.

Mounted on the shaft 2 and located within the frame 1 is a frusto-conical friction gear 8. Mounted upon the shaft 6 are two oppositely facing bevel friction gears 9 driven by the gear 8 in opposite directions. 10 represents an idle friction gear corresponding in shape and formation with the driving gear 8. The gear 10 is mounted upon the shaft 11 suitably journaled in the frame 1, the shaft 11 being in line with the shaft 2 and being longitudinally shiftable.

A sleeve 12 surrounds the shaft 2 and is slidable through the frame 1 and is held from moving longitudinally upon the shaft 2 by means of a collar 13 fastened to the shaft 2 by means of a set screw 14. The shaft 2 is freely rotatable in the sleeve 12 but when the sleeve 12 is shifted by means hereinafter described, it operates to impart a corresponding longitudinal movement to the shaft 2. A gear 15 is feathered to the sleeve 12 by means of a pin or key 16 which enters and works in a longitudinal slot 17 in the sleeve 12, this being done in order to admit of the sliding of the sleeve 12 with the shaft 2 through the gear 15 in order to advance and retract the driving gear 8.

The shaft 11 is surrounded by a sleeve 18 which is held from moving longitudinally of the shaft 11 by a collar 19 secured in place thereon by a set screw 20. The sleeve 18 is slidable longitudinally through the frame, carrying with it the shaft 11 which is freely rotatable in said sleeve 18. A gear 21 is feathered to the sleeve 18 by means of a pin 22 which enters and works in the longitudinal slot 23 in the sleeve 18. The gears 15 and 21 mesh with and are actuated by other gears 24 and 25 on a countershaft 26. By turning the shaft 26 by means of any manually controlled device, both of the gears 15 and 21 are simultaneously turned for the purpose of advancing and retracting the gears 8 and 10.

The means for shifting the gears comprises three bell crank levers 27, 28 and 29 each being mounted on a pivot 30 supported at its opposite ends by the top and bottom cover plates 31 and 32 for the frame 1. One of the bell crank levers is connected to an internally threaded runner or nut 33 by means of a pin 34 projecting from said runner and working in a slot 35 in said lever. The runner 33 is engaged by threads 36 on the sleeve 12 and therefore as said sleeve is turned by the gears 15 and 25, the gear 8 is either advanced or retracted according to the direction in which the sleeve 12 is turned, it being understood that the runner or nut 36 is held from moving by the bell crank lever 28 which is in turn held from moving by a gear shifting rod 37, which may connect with a lever or other manual controlling device within reach of the operator.

In like manner the lever 29 is formed with a longitudinal slot 38 which receives a pin 39 extending from a nut or runner 40 engaging threads 41 on the sleeve 18 hereinabove described. When the lever 28 is held from movement, the lever 29 is also held from movement as it is connected with the lever 28 by means to be described.

Each of the gears 9 is mounted upon a sleeve 42 and the latter in turn surrounds another sleeve 43 which in turn surrounds the driven shaft 6. The outer ends of the sleeve 43 are formed with clutch faces 44 adapted to be engaged by clutches 45 and 46 slidable on the shaft 6 and feathered thereto by means of keys or pins 47 which work in slots 48 in said clutches. Any suitable means may be employed for shifting the clutch members 45 and 46. As the gears 9 are simultaneously driven in opposite directions by coöperation with the driving gear 8, it will be understood that by throwing the clutch member 45 into engagement with the adjacent clutch face 44, the shaft 6 will be driven in one direction, and when the other clutch member 46 is thrown into engagement with the adjacent clutch face 44, the shaft will be driven in the opposite direction. This provides for reversing the direction of travel of the vehicle in conjunction with which the transmission mechanism is used.

Each of the bell crank levers 27, 28 and 29 is connected to the sleeves 42 by means of a bearing 51 which surrounds sleeve 42 from which pin 49 projects and works in a longitudinal slot 50 in the adjacent arm of each lever. Each of the bearings 51 is held in place by a collar or shoulder 52 and a set screw 53. It will now be apparent that when the bell crank levers 27, 28 and 29 are rocked on their pivotal connection with the frame, as the sleeves 12 and 18 are shifted inwardly, for example, the sleeves 42 are shifted outwardly or away from each other, and when the sleeves 12 and 18 are shifted away from each other, the sleeves 42 are shifted toward each other. In this way the gears 8, 9 and 10 may move from the low speed position shown in Fig. 3 to the high speed position shown in Fig. 1 or vice versa or they may move to an intermediate position to give other speed ratios.

It will be understood from the foregoing description taken in connection with the accompanying drawings that the main gear shifting movement is effected by means of the shifting rod 37 which may be controlled by the usual gear shifting lever (not shown). The gear shifting countershaft 26 is brought into use for the purpose of shifting the gears 8, 9 and 10 into tight driving frictional engagement with each other. In order to shift the gears from one speed to another, the shaft 26 is first turned through a part of a revolution in order to relieve the tight frictional engagement between the gears 8, 9 and 10. As soon as said gears are out of actual contact with each other, then by means of the shifting rod 37, the gears may be quickly shifted to another speed through the medium of the bell crank levers 27, 28 and 29, it being understood that there is nothing to prevent the free sliding movement of the sleeves 12 and 18 and also the sleeves 42 through the frame 1.

The pins 34, 39 and 49 work in grooves 54 and 55 in the cover plates 31 and 32. The grooves 54 and 55 go only partly through the cover plates 31 and 32. This is done so that the pins 34, 39 and 49 cannot work through the cover plates 31 and 32. The gears 8, 9 and 10 may be transposed if need be, as it gives the driven gears more speed than the driving gear; that is, the gears 8 and 10 may be fast to sleeves 42 and the gears 9 may be fast to shafts 2 and 11.

I claim:—

1. In variable speed transmission gearing, the combination of a driving shaft, a driven shaft, a driving gear mounted on and actuated by the driving shaft, driven gears coöperating with said driving gear mounted upon and adapted to actuate the driven shaft, means for throwing either one of said driven gears into clutched engagement with the driven shaft, and means for simultaneously advancing and retracting said driving and driven gears to vary the ratio of speed between the driving and driven shafts.

2. In variable speed transmission gearing, the combination of a driving shaft, a driven shaft, a driving gear mounted on and actuated by the driving shaft, driven gears coöperating with said driving gear mounted upon and adapted to actuate the driven shaft, means for throwing either one of said driven gears into clutched engagement with the driven shaft, and means for simultaneously advancing and retracting said driving and driven gears to vary the ratio of speed between the driving and driven shafts, said means comprising three bell crank levers controlled by a shifting rod and controlling the driving and driven gears.

3. In variable speed transmission gearing, the combination of a driving shaft, a driven shaft, a driving gear mounted on and actuated by the driving shaft, driven gears coöperating with said driving gear mounted upon and adapted to actuate the driven shaft, means for throwing either one of said driven gears into clutched engagement with the driven shaft, means for simultaneously advancing and retracting said driving and driven gears to vary the ratio of speed between the driving and driven shafts, an idle gear driven by said driven gears and arranged in opposition to the driving gear, a shaft on which said idle gear is mounted, and means controlled by a shifting rod for simultaneously advancing and retracting the driving gear and the driven gears.

4. In variable speed transmission gearing, the combination of a driving shaft, a driven shaft, a driving gear mounted on and actuated by the driving shaft, driven gears coöperating with said driving gear mounted upon and adapted to actuate the driven shaft, means for throwing either one of said driven gears into clutched engagement with the driven shaft, means for simultaneously advancing and retracting said driving and driven gears to vary the ratio of speed between the driving and driven shafts, an idle gear driven by said driven gears and arranged in opposition to the driving gear, a shaft on which said idle gear is mounted, and means controlled by a shifting rod for simultaneously advancing and retracting the driving gear and the driven gears, said means comprising three bell crank levers one of which is actuated by a shifting rod and serves to shift the other two which in turn shift the driving gear and the driven gears.

5. In variable speed transmission gearing, the combination of a driving shaft, a driven shaft, a driving gear mounted on and actuated by the driving shaft, driven gears coöperating with said driving gear mounted upon and adapted to actuate the driven shaft, means for throwing either one of said driven gears into clutched engagement with the driven shaft, means for simultaneously advancing and retracting said driving and driven gears to vary the ratio of speed between the driving and driven shafts, an idle gear driven by said driven gears and arranged in opposition to the driving gear, a shaft on which said idle gear is mounted, means controlled by a shifting rod for simultaneously advancing and retracting the driving gear and the driven gears, bearing sleeves in which the driving shaft and the shaft of the idle gear are journaled, gears on said sleeves, a gear shifting shaft, and gears on the last named shaft meshing with the gears on said bearing sleeves.

In testimony whereof I affix my signature.

FRED KAWELL.

Copies of this patent may be obtained for five cents each, by addressing the "Commissioner of Patents, Washington, D. C."